(12) United States Patent
Nakayama et al.

(10) Patent No.: US 9,425,595 B2
(45) Date of Patent: Aug. 23, 2016

(54) WIRING MODULE

(71) Applicants: AUTONETWORKS TECHNOLOGIES, LTD, Yokkaichi, Mie (JP); SUMITOMO WIRING SYSTEMS, LTD., Yokkaichi, Mie (JP); SUMITOMO ELECTRIC INDUSTRIES, LTD., Osaka-shi, Osaka (JP)

(72) Inventors: Osamu Nakayama, Yokkaichi (JP); Mitsutoshi Morita, Yokkaichi (JP); Kotaro Takada, Yokkaichi (JP)

(73) Assignees: AUTONETWORKS TECHNOLOGIES, LTD., Mie (JP); SUMITOMO WIRING SYSTEMS, LTD., Mie (JP); SUMITOMO ELECTRIC INDUSTRIES, LTD., Osaka (JP)

( * ) Notice: Subject to any disclaimer, the term of this patent is extended or adjusted under 35 U.S.C. 154(b) by 0 days.

(21) Appl. No.: 14/765,504

(22) PCT Filed: Dec. 19, 2013

(86) PCT No.: PCT/JP2013/084069
§ 371 (c)(1),
(2) Date: Aug. 3, 2015

(87) PCT Pub. No.: WO2015/015667
PCT Pub. Date: Feb. 5, 2015

(65) Prior Publication Data
US 2015/0372465 A1    Dec. 24, 2015

(30) Foreign Application Priority Data

Jul. 30, 2013  (JP) .................................. 2013-157672

(51) Int. Cl.
*H02G 15/02*  (2006.01)
*H02G 15/04*  (2006.01)
(Continued)

(52) U.S. Cl.
CPC ......... *H02G 3/0437* (2013.01); *B60L 11/1861* (2013.01); *B60L 11/1877* (2013.01);
(Continued)

(58) Field of Classification Search
CPC .......... B60L 11/1877; B60L 11/1879; B60R 16/0215; H02G 3/0418; H02G 3/0437
USPC ...................................... 174/74 R
See application file for complete search history.

(56) References Cited

U.S. PATENT DOCUMENTS

2002/0195260 A1    12/2002  Marks
2008/0220324 A1*    9/2008  Phillips ..................... B25F 5/02
                                                      429/120
(Continued)

FOREIGN PATENT DOCUMENTS

EP         2 706 593 A1      3/2014
JP         H11-205958 A      7/1999
(Continued)

OTHER PUBLICATIONS

Nov. 2, 2015 Search Report issued in European Application No. 13 89 0525.2.
(Continued)

*Primary Examiner* — Timothy Thompson
*Assistant Examiner* — Rhadames J Alonzo Miller
(74) *Attorney, Agent, or Firm* — Oliff PLC

(57) ABSTRACT

A wiring module includes a connecting member configured to connect neighboring electrode terminals of electrical storage elements that each have a positive electrode terminal and a negative electrode terminal and an insulating protector that accommodates the connecting member. The insulating protector includes a main body configured to hold the connecting member, an insulating cover that is supported by the main body so as to be capable of moving to a closed position in which the insulating cover covers at least part of the connecting member, and an electric wire guide that can be laid over at least a portion of the insulating cover located in the closed position and that has an electric wire passing portion through which an electric wire can be passed.

13 Claims, 8 Drawing Sheets

(51) Int. Cl.
  *H02G 3/04* (2006.01)
  *H01M 2/20* (2006.01)
  *B60L 11/18* (2006.01)
  *H01M 10/48* (2006.01)
  *B60R 16/02* (2006.01)

(52) U.S. Cl.
  CPC ........ *B60L11/1879* (2013.01); *B60R 16/0215* (2013.01); *H01M 2/206* (2013.01); *H01M 10/482* (2013.01); *H02G 3/0418* (2013.01); *B60L 2240/545* (2013.01); *B60L 2240/547* (2013.01); *B60L 2240/549* (2013.01); *H01M 2220/20* (2013.01); *Y02T 10/705* (2013.01); *Y02T 10/7005* (2013.01); *Y02T 10/7044* (2013.01)

(56) References Cited

U.S. PATENT DOCUMENTS

2009/0130903 A1   5/2009   Tsukashima et al.
2013/0280959 A1*  10/2013  Takase ............... H01M 2/1077
                                                      439/627

FOREIGN PATENT DOCUMENTS

| JP | H11-238991 A | 8/1999 | |
| JP | 2006-344398 A | 12/2006 | |
| JP | 2008-193106 A | 8/2008 | |
| JP | 2008-243412 A | 10/2008 | |
| JP | 2009-147052 A | 7/2009 | |
| JP | 2012-064457 A | 3/2012 | |
| JP | WO 2012169373 A1 * | 12/2012 | ........... H01M 2/206 |
| JP | 2013-162728 A | 8/2013 | |
| JP | 2706593 A1 * | 3/2014 | ........... H01M 2/206 |
| WO | 2012/169373 A1 | 12/2012 | |
| WO | 2013/061871 A1 | 5/2013 | |
| WO | 2013/118396 A1 | 8/2013 | |
| WO | 2013/187056 A1 | 12/2013 | |

OTHER PUBLICATIONS

Feb. 25, 2014 International Search Report issued in International Application No. PCTJP2013/084069.

* cited by examiner

WIRING MODULE

BACKGROUND

The present disclosure relates to a wiring module.

Arrangements are known in which a plurality of electrical storage elements having positive and negative electrode terminals are lined up in a row in electrical storage modules for electric cars and hybrid cars, and are connected in series or in parallel by connecting the electrode terminals of the electrical storage elements with connecting members.

JP 2012-64457A describes a battery connecting member including terminals for connecting electrodes of a plurality of batteries and a case for accommodating the terminals. A central coupling portion that couples a right block and a left block in the battery connecting member is provided with an insulating cover portion having an electric wire guiding portion on the outer surface side, a temporary locking cover portion for covering a portion of an open surface of the electric wire guiding portion, and a final locking cover portion for covering the entire open surface of the electric wire guiding portion, which are formed in one piece. The temporary locking cover portion has a locking claw, and the locking claw is locked to a locked portion formed in the insulating cover portion.

SUMMARY

JP 2012-64457A describes a configuration in which the locking claw of the temporary locking cover portion is locked to the locked portion formed in the insulating cover portion. However, in the case where the insulating cover portion is provided with the locked portion, processing for, for example, providing a removing hole for a metal mold is required to form the locked portion in the insulating cover portion, and therefore, there is a concern that insulating properties decrease.

The various embodiments of the present disclosure were made based on the foregoing circumstances, and it is an object thereof to provide a wiring module that can suppress a decrease in insulating properties.

The present disclosure provides a wiring module including a connecting member configured to connect neighboring electrode terminals of electrical storage elements that each have a positive electrode terminal and a negative electrode terminal; and an insulating protector that accommodates the connecting member, wherein the insulating protector includes a main body that holds the connecting member, an insulating cover that is supported by the main body so as to be capable of moving to a closed position in which the insulating cover covers at least part of the connecting member, and an electric wire guide that can be laid over at least a portion of the insulating cover located in the closed position and that has an electric wire passing portion through which an electric wire can be passed.

With this aspect, since the electric wire guide having the electric wire passing portion is laid over at least a portion of the insulating cover, there is no need to form a structure, such as a removing hole for a metal mold, for temporarily locking the electric wire to the insulating cover compared with a configuration in which the electric wire is passed through the insulating cover and is temporarily locked, thus making it possible to suppress a decrease in insulating properties.

It is preferable that the embodiments of the present disclosure have the following aspects in addition to the above-described aspect.

The electric wire guide includes a holding piece for holding the electric wire in the electric wire passing portion and a removing hole for forming the holding piece.

In the case where the holding piece for holding the electric wire is formed, there is a concern that insulating properties decrease due to a removing hole for forming the holding piece. However, with this aspect, since the electric wire guide is laid over the insulating cover, it is possible to suppress a decrease in insulating properties even in such a case.

The insulating cover and the electric wire guide are respectively connected to the main body on opposite sides of the connecting member.

An electric wire cover for covering the electric wire passing portion is supported by the electric wire guide.

With the various embodiments of the present disclosure, it is possible to suppress a decrease in insulating properties.

DETAILED DESCRIPTION OF EMBODIMENTS

Embodiment 1

Figure 1:
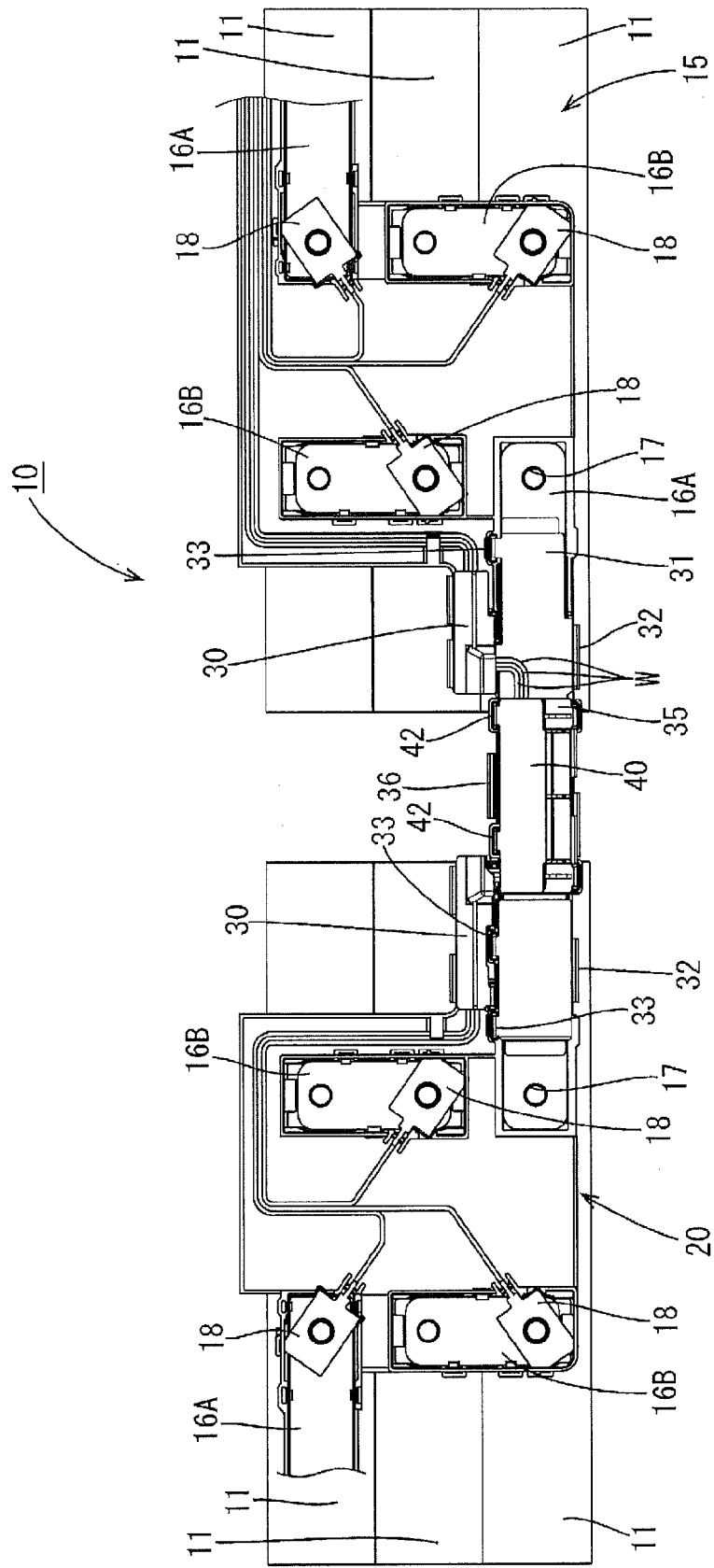
FIG. 1 is a plan view of an electrical storage module including a wiring module according to Embodiment 1.

Hereinafter, an embodiment will be described with reference to FIGS. 1 to 8. As shown in FIG. 1, a wiring module 15 of this embodiment is attached to a plurality of electrical storage elements 11 (six elements are shown in this embodiment) that are lined up, constituting an electrical storage module 10. The electrical storage module 10 is used as, for example, a driving source for a vehicle such as an electric car or a hybrid car. In the following description, in terms of the front-to-rear direction, the upper side of FIG. 1 is referred to as "front side" and the lower side thereof is referred to as "rear side". The horizontal (left-right) direction is based on FIG. 1. In terms of the vertical direction, the side above the paper plane of FIG. 1 is referred to as "upper side" and the side below the paper plane thereof is referred to as "lower side".

Electrical Storage Module 10

The electrical storage module 10 includes the plurality of electrical storage elements 11 and the wiring module 15 (whose left and right end portions are omitted in FIG. 1) attached to the plurality of electrical storage elements 11.

Figure 2:
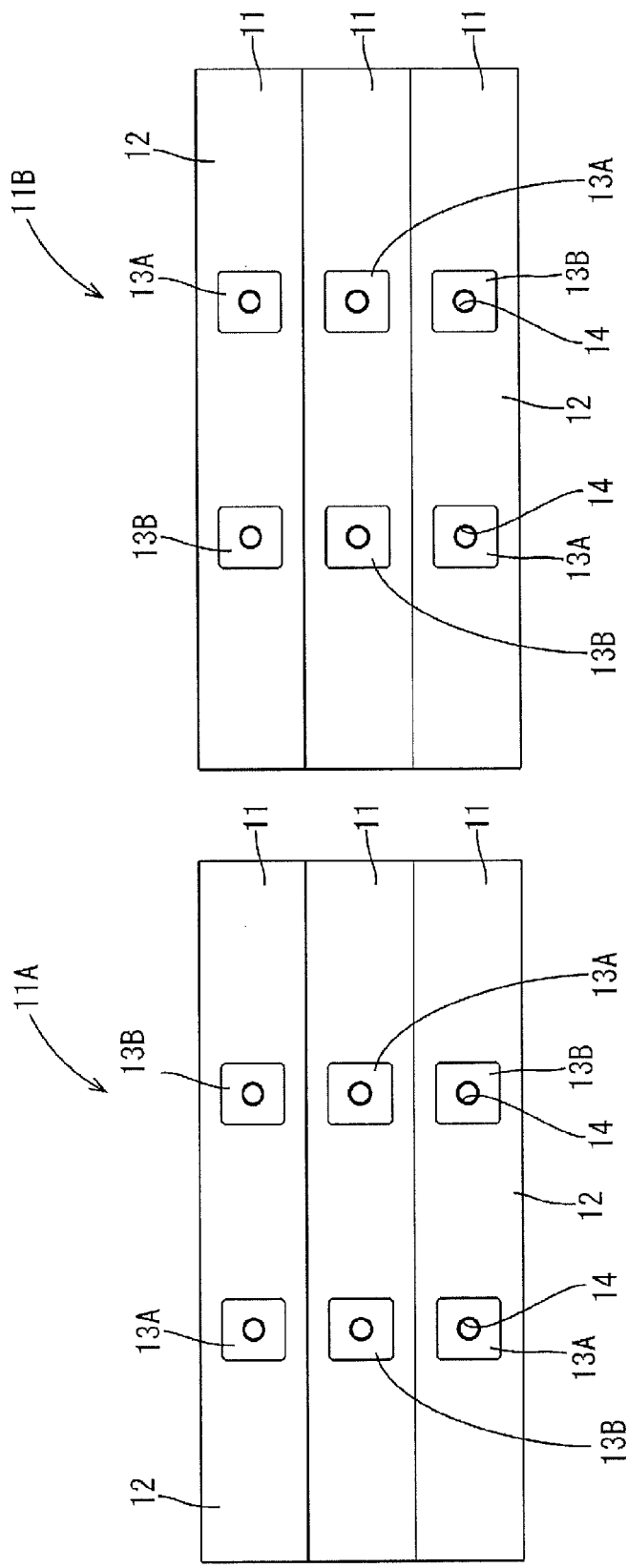
FIG. 2 is a plan view of a plurality of electrical storage element groups.

As shown in FIG. 2, the electrical storage elements 11 each have a flattened shape that is short in the front-to-rear direction and elongate in the horizontal direction, and electrical storage element groups 11A and 11B in each of which the three electrical storage elements 11 are lined up in the front-to-rear direction (short-length direction) are lined up in the horizontal direction (longitudinal direction) with a gap therebetween.

The electrical storage elements 11 each have electrode terminals 13A and 13B (a positive electrode is shown as the electrode terminal 13A and a negative electrode is shown as the electrode terminal 13B) that project at a right angle from an end surface of a flattened rectangular parallelepiped main body portion 12 accommodating an electrical storage constituent (not shown).

The electrode terminals 13A and 13B have a nut shape having a screw hole 14, and the outer circumferences thereof are covered with a synthetic resin. The polarities (positive or negative) of the respective electrical storage elements 11 are arranged such that the electrode terminals 13A and 13B of the neighboring electrical storage elements 11 are opposite to each other, and thus a configuration in which the electrode terminals 13A and 13B are adjacent to the heteropolar electrode terminals is obtained. The plurality of electrical storage elements 11 are fixed by holding plates (not shown).

Wiring Module 15

Figure 7:
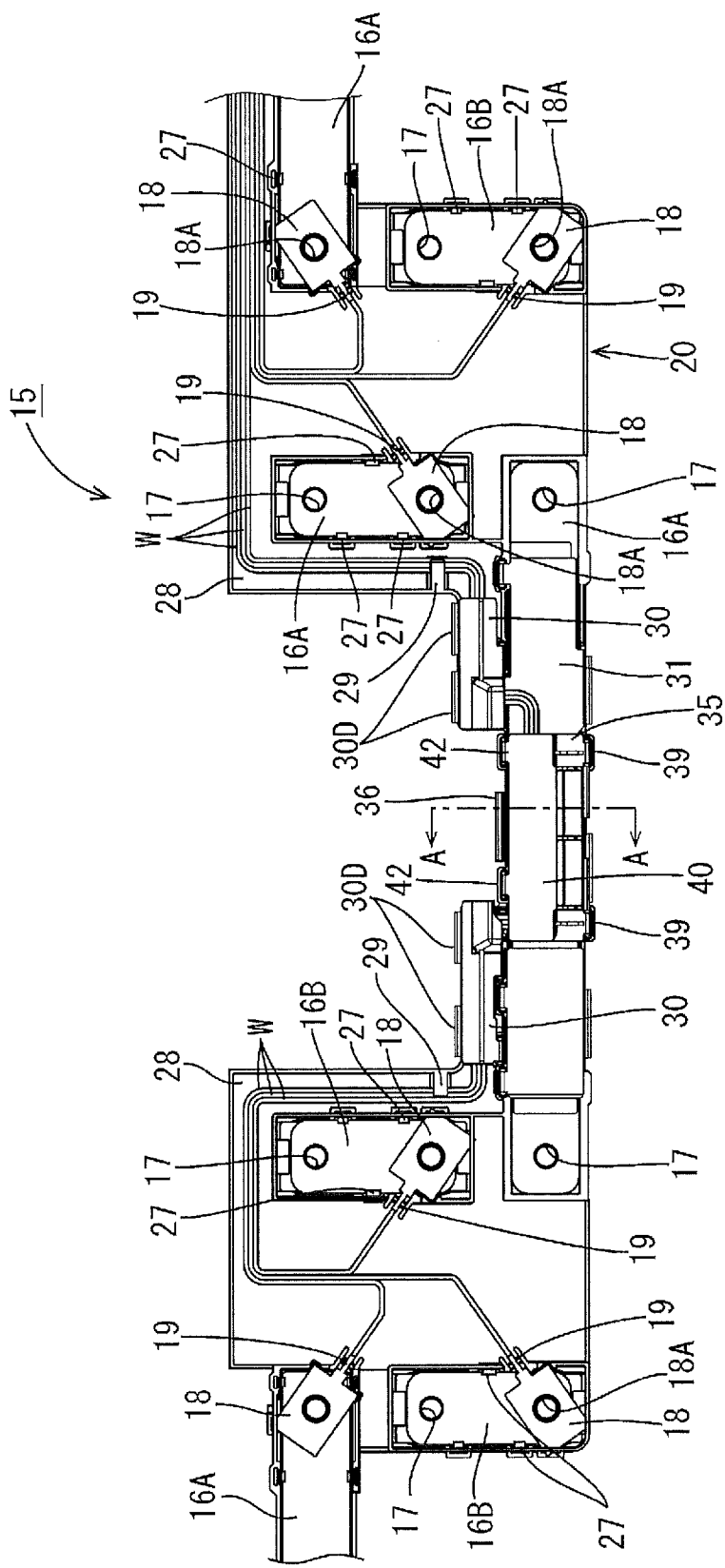
FIG. 7 is a plan view of the wiring module in which an electric wire cover is closed.
Figure 8:
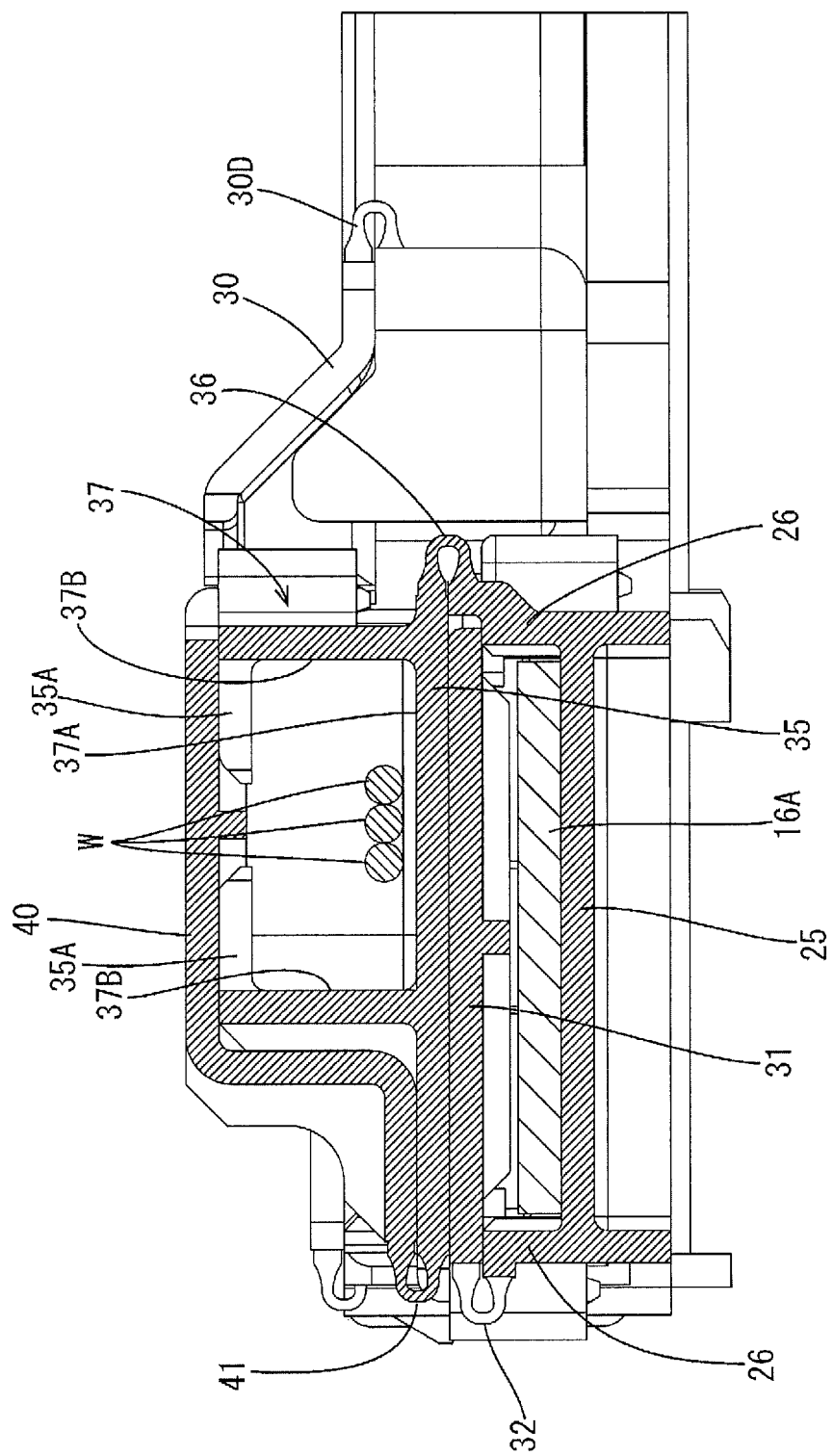
FIG. 8 is a cross-sectional view taken along line A-A in FIG. 7.

As shown in FIG. 7, the wiring module 15 includes a plurality of connecting members 16A and 16B that connect the electrode terminals 13A and 13B of the neighboring electrical storage elements 11, voltage detection terminals 18 that are laid over the connecting members 16B, and an insulating protector 20 that holds the plurality of connecting members 16A and 16B and the voltage detection terminals 18.

Connecting Members 16A and 16B

The connecting members 16A and 16B are constituted by two types of metal plates that are different in length, including an elongate connecting member 16A that connects the electrode terminals 13A and 13B in the horizontal direction, which have a long gap therebetween, and a short connecting member 16B that connects the electrode terminals 13A and 13B in the front-to-rear direction, which have a short gap therebetween.

The connecting members 16A and 16B are each formed by pressing a metal plate made of copper, copper alloy, stainless steel (SUS), aluminum, or the like into a predetermined shape. The surfaces of the connecting members 16A and 16B are plated with metal such as tin, nickel, or the like. A pair of insertion holes 17 having a substantially circular shape is formed through each of the connecting members 16A and 16B. The connecting members 16A and 16B are disposed such that the insertion holes 17 are continuous with the screw holes 14 of the electrode terminals 13A and 13B, and the adjacent electrode terminals 13A and 13B are electrically connected via the connecting members 16A and 16B by inserting shaft portions of bolts (not shown) into the insertion holes 17 and fastening the bolts.

The voltage detection terminals 18 are each made of a rectangular metal plate, and are formed in one piece with an electric wire connecting portion 19 that is connected to the end portion of an electric wire W. An insertion hole 18A having a circular shape is formed through the voltage detection terminal 18. The voltage detection terminal 18 is disposed such that the axis of the electric wire W connected to the electric wire connecting portion 19 extends inclining to the direction orthogonal to the connecting direction of the connecting member 16B.

The electric wire W is connected to a battery ECU (not shown). The battery ECU is equipped with a microcomputer, further elements, and the like, and has a well-known configuration with functions of detecting a voltage, current, temperature and the like of the electrical storage elements 11 and controlling the charge/discharge and the like of the respective electrical storage elements 11.

Insulating Protector 20

Figure 3:
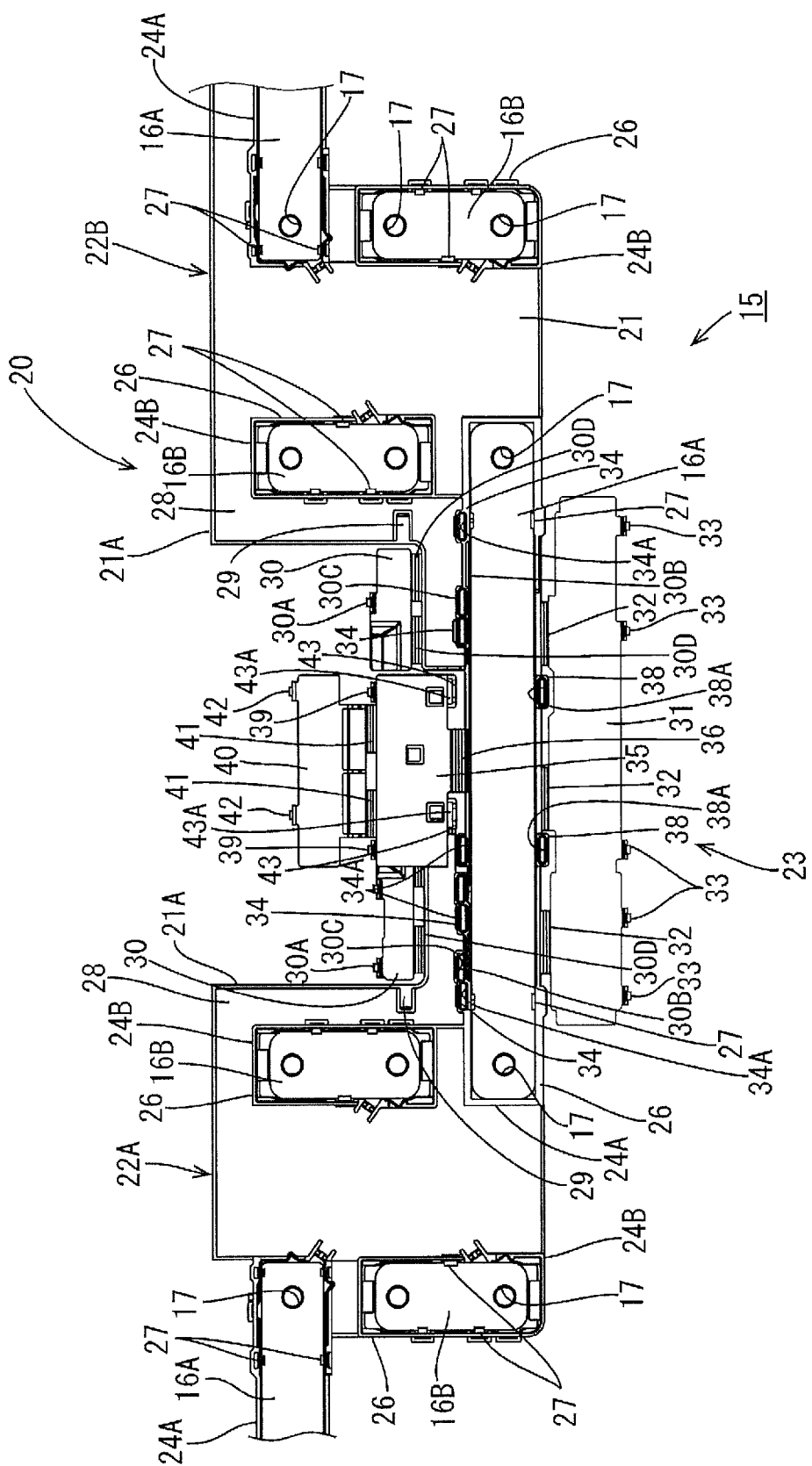
FIG. 3 is a plan view of a wiring module in which an insulating cover is open.

The insulating protector 20 is made of an insulating synthetic resin. As shown in FIG. 3, the insulating protector 20 includes a main body 21 for holding the connecting members 16A and 16B, an insulating cover 31 that is formed in one piece with the main body 21 and that can rotate to a closed position in which the insulating cover 31 covers the elongate connecting member 16A (FIG. 3 shows an open state in which the insulating cover 31 does not cover the elongate connecting member 16A), and an electric wire guide 35 that is to be laid over the intermediate portion of the insulating cover 31 disposed in the closed position.

The main body 21 has a pair of left and right mounting portions 22A and 22B that are respectively mounted on the left and right electrical storage element groups 11A and 11B, and a coupling portion 23 that couples the left and right mounting portions 22A and 22B. It should be noted that the main body 21 is configured by coupling two separate members that can be separated to a left portion and a right portion at the position of the coupling portion 23.

Main Body 21

The main body 21 includes connecting member holding portions 24A for holding the elongate connecting members 16A and connecting member holding portions 24B for holding the short connecting members 16B. The connecting member holding portions 24A and 24B each have a bottom plate 25 (see FIG. 8) having a planar shape on which the connecting member 16A or 16B is mounted, and partition walls 26 that are provided upright on the bottom plate 25 so as to extend along the peripheral edge of the connecting member 16A or 16B and that separate the connecting members 16A or 16B from the outside in an insulating manner.

Opening portions (not shown) into which the upper end portions of the electrode terminals 13A and 13B are to be inserted are formed on the back surface side of the connecting member holding portions 24A and 24B. As shown in FIG. 3, the partition walls 26 are each provided with a plurality of pressing pieces 27 that project toward the inner side of the partition walls 26 and that prevent the connecting members 16A or 16B from dislodging upward.

The partition walls 26 of the connecting member holding portion 24A for holding the elongate connecting member 16A are provided with locked portions 30B, first locked portions 34, and second locked portions 38 to which auxiliary cover portions 30, the insulating cover 31, and the electric wire guide 35 are respectively locked into the closed position. The locked portions 30B and 34 are disposed to be lined up on the front side of the partition walls 26, and the second locked portions 38 are disposed on the rear side of the partition walls 26.

Locking holes 30C, 34A, and 38A are respectively formed through the locked portions 30B, the first locked portions 34, and the second locked portions 38. The locking holes 30C, 34A, and 38A have a long-hole shape that is elongate in the horizontal direction.

The auxiliary cover portions 30 for covering the electric wires W that are arranged along the elongate connecting member 16A are each connected to an electric wire arrangement portion 28 on the front side of the elongate connecting member 16A in the main body 21 via hinge portions 30D. A locking piece 30A projects from the front end portion of each auxiliary cover portion 30. The locking pieces 30A are locked to the hole edges of the locking holes 30C of the locked portions 30B in the main body 21, and thus the auxiliary cover portions 30 are held in the closed position in which the auxiliary cover portions 30 cover the electric wires W in the electric wire arrangement portion 28.

The electric wire arrangement portion 28 is formed in a region other than the connecting member holding portions 24A and 24B in the main body 21, and is used to collectively arrange the electric wires W on the edge side of the main body 21. On a peripheral wall 21A that is provided upright on the edge portion of the main body 21, dislodgment restricting pieces 29 that restrict the dislodgment of the electric wires W extend in the direction along the plate surface of the electric wire arrangement portion 28.

Insulating Cover 31

The insulating cover 31 has a planar shape that is elongate in the horizontal direction, is formed to be long enough to cover substantially the entire elongate connecting member 16A other than the left and right end portions, and is connected to the rear end portion of the connecting member holding portion 24A via first hinge portions 32.

The first hinge portions 32 have flexibility by being formed in a thin band shape, and are formed in one piece with the main body 21 and the insulating cover 31. The plurality of (three in this embodiment) first hinge portions 32 are provided with gaps therebetween in the horizontal direction.

A plurality of (five in this embodiment) first locking portions 33 are formed with gaps therebetween in the horizontal direction at the edge of the insulating cover 31 on the side opposite to the first hinge portions 32.

The first locking portions 33 each project from the plate surface of the insulating cover 31 in the rising direction, have a locking claw in the front end portion, and can be bent and deformed in the front-to-rear direction. When the insulating cover 31 is located in the closed position in which the insulating cover 31 is laid over the connecting member holding portion 24A and covers the elongate connecting member 16A, the first locking portions 33 are inserted into the locking holes 34A of the connecting member holding portion 24A and the locking claws are locked to the hole edges of the locking holes 34A. Thus, the first locking portions 33 are locked to the first locked portions 34, and the insulating cover 31 is held in the closed position.

Electric Wire Guide 35

The electric wire guide 35 has a planar shape that is elongate in the horizontal direction and is shorter than the insulating cover 31. The electric wire guide 35 covers an intermediate portion of the insulating cover 31, and does not cover the left and right end portions of the insulating cover 31. The electric wire guide 35 is connected to the front end portion of the connecting member holding portion 24A via a second hinge portion 36. The second hinge portion 36 can be bent and deformed by being formed to have a small thickness, and is formed in one piece with the electric wire guide 35 and the connecting member holding portion 24A.

The second hinge portion 36 is connected to the connecting member holding portion 24A holding the elongate connecting member 16A on the side opposite to the insulating cover 31. The electric wire guide 35 can rotate relative to the main body 21 due to the second hinge portion 36.

Figure 5:
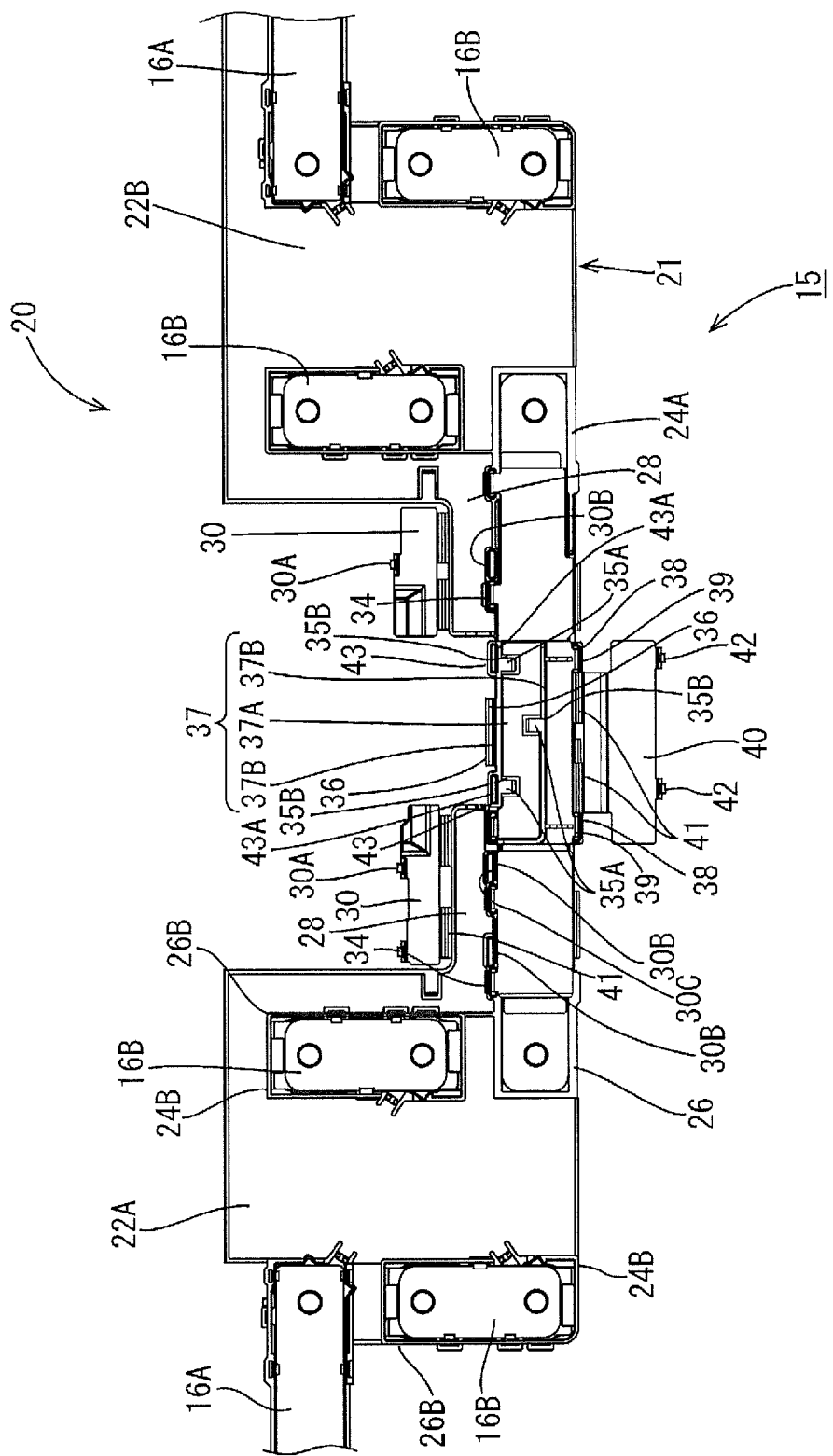
FIG. 5 is a plan view of the wiring module in which an electric wire guide is closed.

As shown in FIG. 5, an electric wire passing portion 37 through which the electric wires W are passed is provided on the surface on the side opposite to the surface of the electric wire guide 35 that is opposed to the insulating cover 31, that is, on the outer surface of the electric wire guide 35 when the electric wire guide 35 covers the insulating cover 31 in the closed position.

The electric wire passing portion 37 has a groove shape extending in the horizontal direction, and holding pieces 35A project toward the inner side from the upper end portions of groove walls 37B that rise from the two sides of a groove bottom 37A. The holding pieces 35A restrict the dislodgment of the electric wires W from the electric wire passing portion 37. The groove bottom 37A is provided with removing holes 35B for a metal mold to be used when forming the holding pieces 35A using a metal mold.

A plurality of second locking portions 39 are formed in the end portion of the electric wire guide 35 on the side opposite to the second hinge portion 36. The second locking portions 39 each project in the direction orthogonal to the plate surface of the electric wire guide 35, have a locking claw in the front end portion, and can be bent and deformed in the front-to-rear direction.

When the electric wire guide 35 is located in the closed position in which the electric wire guide 35 is laid over the upper surface of the insulating cover 31 located in the closed position and covers it, the second locking portions 39 are inserted into the locking holes 38A penetrating the second locked portions 38 of the connecting member holding portion 24A and the locking claws are locked to the hole edges of the locking holes 38A. Thus, the electric wire guide 35 is held in the closed position.

An electric wire cover 40 for covering the electric wire passing portion 37 is connected to the electric wire guide 35. The electric wire cover 40 is connected to the electric wire guide 35 via a plurality of third hinge portions 41 that are provided at the side edge on the side opposite to the second hinge portion 36 of the electric wire guide 35.

The third hinge portions 41 are each band-shaped members that are formed in one piece with the electric wire cover 40 and the electric wire guide 35, and can be bent and deformed by being formed to have a small thickness.

Electric Wire Cover 40

Third locking portions 42 are formed at the side edge of the electric wire cover 40 on the side opposite to the third hinge portions 41. The third locking portions 42 each project in the direction orthogonal to the plate surface of the electric wire cover 40, have a locking claw in the front end portion, and can be bent and deformed in the front-to-rear direction.

When the electric wire cover 40 is located in the closed position by laying the electric wire cover 40 over the electric wire guide 35, the third locking portions 42 are inserted into locking holes 43A penetrating third locked portions 43 of the electric wire guide 35 and the locking claws are locked to the hole edges of the locking holes 43A. Thus, the electric wire cover 40 is held in the closed position.

Next, the assembly of the wiring module 15 will be described. The connecting members 16A and 16B are accommodated in the connecting member holding portions 24A and 24B of the insulating protector 20 in which the insulating covers 31 and 35 are open (FIG. 3).

Figure 4:
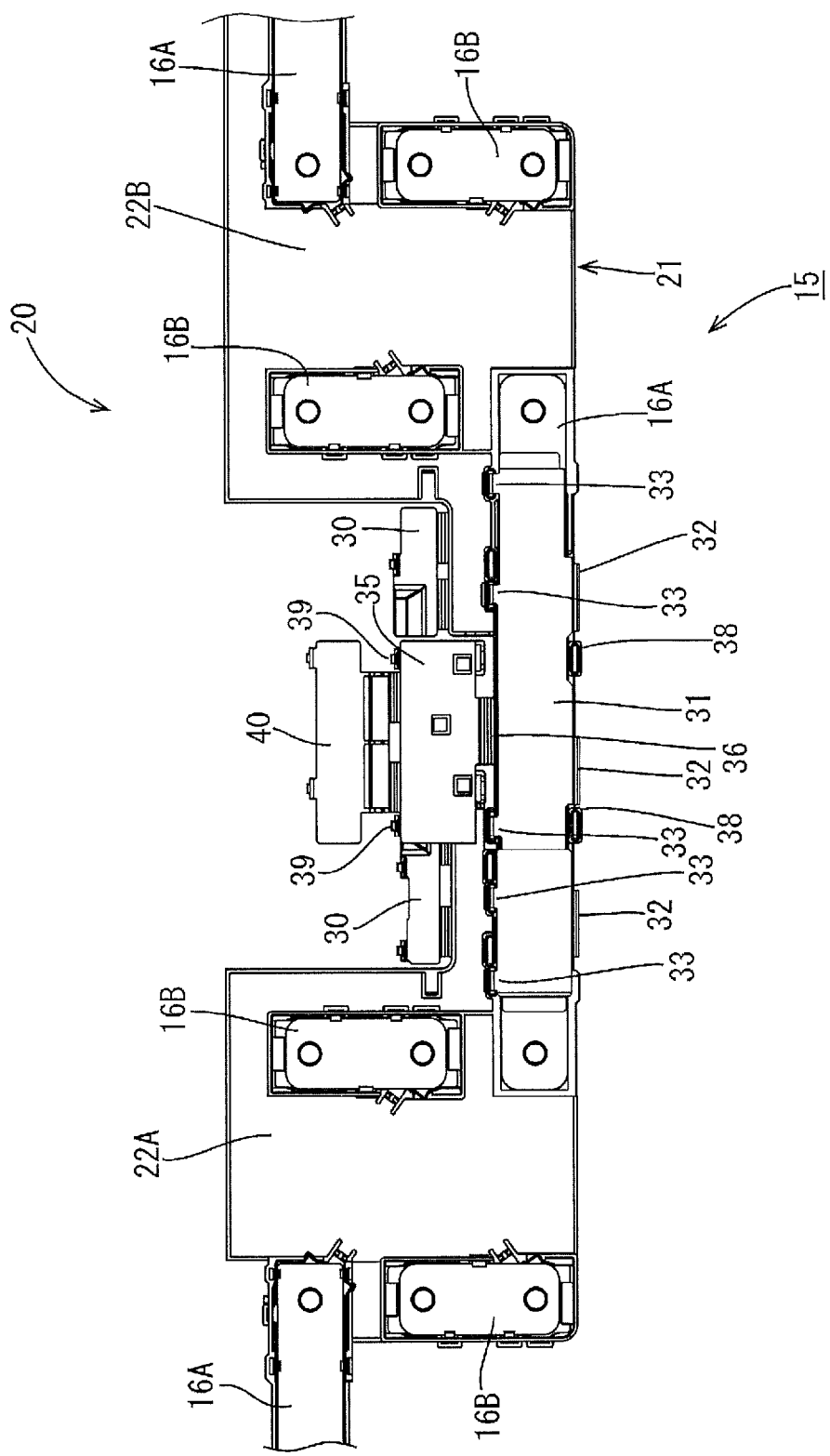
FIG. 4 is a plan view of the wiring module in which an insulating cover is closed.

Next, the insulating cover 31 is rotated about the first hinge portions 32 as axes to the side on which the insulating cover 31 is opposed to the elongate connecting member 16A, and is located in the closed position in which the insulating cover 31 covers the elongate connecting member 16A. Then, the first locking portions 33 are locked to the first locked portions 34 (FIG. 4).

Figure 6:
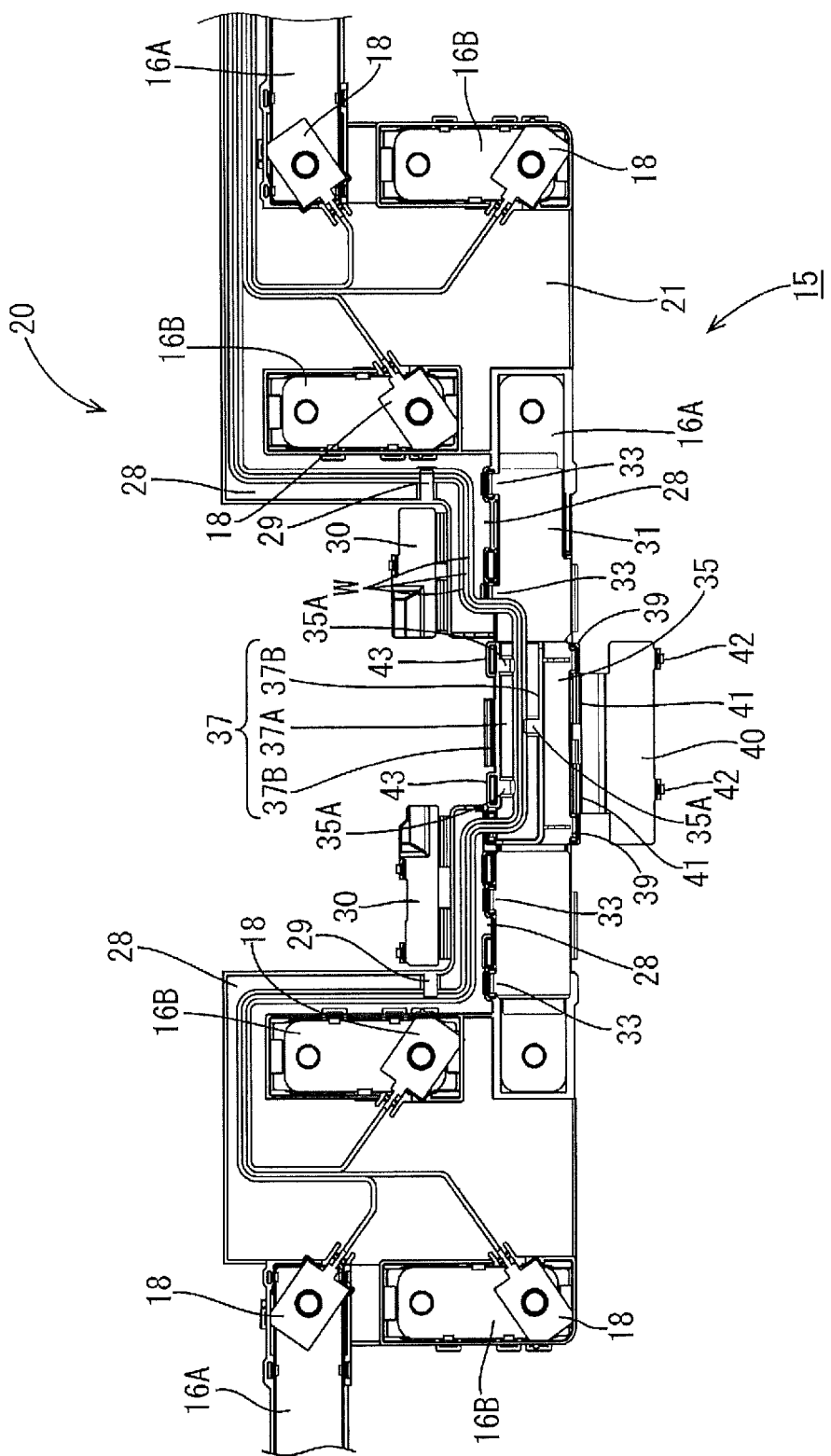
FIG. 6 is a plan view of the wiring module in which electric wires are arranged in the state shown in FIG. 5.

Next, the electric wire guide 35 is rotated about the second hinge portion 36 as an axis to the side on which the electric wire guide 35 is opposed to the insulating cover 31, and is located in the closed position in which the electric wire guide 35 covers the insulating cover 31. Then, the second locking portions 39 are locked to the second locked portions 38 (FIG. 5). The voltage detection terminals 18 connected to the end portions of the electric wires W are laid over the short connecting members 16B and attached thereto, and the electric wires W are arranged in the electric wire arrangement portion 28 and are guided to the external battery ECU or the like (FIG. 6).

Here, although the electric wires W on the mounting portion 22A side of the insulating protector 20 are guided to the mounting portion 22B side along the elongate connecting member 16A, the electric wires W bypass the intermediate portion side of the elongate connecting member 16A and are passed through the electric wire passing portion 37 of the electric wire guide 35 disposed on the upper side of the elongate connecting member 16A from the electric wire arrangement portion 28 on the lateral side of the elongate connecting member 16A.

By doing this, it is possible to guide the electric wires W on the mounting portion 22A side to the other mounting portion 22B side while ensuring a state in which the electric wires W are insulated from the elongate connecting member 16A even if there is no portion through which the electric wires W can be passed on the lateral side of the elongate connecting member 16A due to, for example, the limitation on arrangement.

The electric wire cover 40 is rotated about the third hinge portions 41 as axes to the side on which the electric wire cover 40 is opposed to the electric wire guide 35, and is located in the closed position in which the electric wire cover 40 covers the electric wire passing portion 37. Then, the third locking portions 42 are locked to the third locked portions 43. In addition, the auxiliary cover portions 30 are rotated to the closed position at which the auxiliary cover portions 30 cover the electric wires W (FIG. 7). The wiring module 15 is thereby formed.

The wiring module 15 is mounted on the plurality of electrical storage elements 11, and the bolts are inserted into the insertion holes 17 of the connecting members 16A and 16B and are fastened to the electrode terminals 13A and 13B. Thus, the electrical storage module 10 is formed.

This embodiment has the following operation and effect. The wiring module 15 of this embodiment includes the connecting member 16A for connecting neighboring electrode terminals 13A and 13B of the plurality of electrical storage elements 11 that have the positive electrode terminal 13A and the negative electrode terminal 13B, and the insulating protector 20 for accommodating the connecting member 16A, wherein the insulating protector 20 includes the main body 21 for holding the connecting member 16A, an insulating cover 31 that is supported so as to be capable of moving to a closed position in which the insulating cover 31 covers the connecting member 16A, and the electric wire guide 35 that can be laid over the intermediate portion (at least a portion) of the insulating cover 31 located in the closed position and that has the electric wire passing portion 37 through which the electric wire W is passed.

For example, in the case where the wiring module is configured, unlike this embodiment, such that the electric wire guide portion is provided on the outer surface of the insulating cover and the temporary locking cover portion, which has a locking claw to be locked to the insulating cover and covers a portion of the open surface of the electric wire guide portion, and the final locking cover portion, which covers the entire open surface of the electric wire guide portion, are formed in one piece, there is a concern that insulating properties decrease because the connecting members are insulated from the outside only by the insulating cover, and in addition, there is a problem in that the dimensions increase by the temporary locking cover portion provided in the insulating cover. On the other hand, with this embodiment, since the electric wire guide 35 having the electric wire passing portion 37 through which the electric wires W are passed is laid over at least a portion of the insulating cover 31, there is no need to form a structure, such as a removing hole for a metal mold, for temporarily locking the electric wires to the insulating cover compared with a configuration in which the electric wire is passed through the insulating cover and is temporarily locked, thus making it possible to suppress a decrease in insulating properties. In addition, the electric wire guide 35 is constituted by insulating members, thus making it possible to further suppress a decrease in insulating properties compared with a configuration in which the connecting members 16A are insulated from the outside only by the insulating cover 31. Furthermore, the electric wires are held without providing the temporary locking cover portion, thus making it possible to make the configuration simpler and smaller than the configuration in which the temporary locking cover portion is provided.

Also, the electric wire guide 35 includes the holding pieces 35A for holding the electric wires W in the electric wire passing portion 37 and the removing holes 35B to be used to form the holding pieces 35A.

In the case where the holding pieces 35A for holding the electric wires W are formed, there is a concern that insulating properties decrease due to the removing holes 35B for forming the holding pieces 35A. However, with this embodiment, since the electric wire guide 35 is laid over the insulating cover 31, it is possible to suppress a decrease in insulating properties even in such a case.

Other Embodiments

The present disclosure is not limited to the embodiment explained by the above description and the drawings. Other embodiments, which will be explained below, for example, are also included in the technical scope of the present disclosure.

(1) The electric wire guide 35 was laid over the intermediate portion of the insulating cover 31, but there is no limitation to this. For example, the electric wire guide 35 may be laid over one side of the insulating cover 31 in the horizontal direction. The electric wire guide 35 may also be laid over the entire insulating cover 31.

(2) Although the insulating cover 31 and the electric wire guide 35 are respectively disposed on opposite sides of the connecting member 16A, the insulating cover 31 and the electric wire guide 35 may be disposed on the same side with respect to the connecting member 16A. In this case, the insulating cover 31 and the electric wire guide 35 may be connected via a hinge portion, for example.

(3) Although the example in which a battery was used as the electrical storage element 11 was shown, a capacitor or the like may be used as the electrical storage element 11.

(4) The number of the electrical storage elements 11 is not limited to the number noted in the above-described embodiment, and can be changed as appropriate. Also, the configuration of the wiring module can be changed as appropriate in accordance with the number of the electrical storage elements 11.

(5) The connecting members 16A and 16B need not be formed by pressing a metal plate made of copper, copper alloy, stainless steel (SUS), aluminum, or the like into a predetermined shape, and the surfaces of the connecting members 16A and 16B need not be plated with metal such as tin, nickel, or the like.

The invention claimed is:

1. A wiring module, comprising:
   a metal connector configured to connect neighboring electrode terminals of electrical storage elements that each have a positive electrode terminal and a negative electrode terminal; and
   an insulating protector that accommodates the metal connector,
   wherein the insulating protector includes:
      a main body that holds the metal connector,
      an insulating cover that is supported by the main body so as to be capable of moving to a closed position in which the insulating cover covers at least part of the metal connector, and
      an electric wire guide that can be laid over at least a portion of the insulating cover located in the closed position and that has an electric wire passing portion configured to pass an electric wire through the electric wire guide.

2. The wiring module according to claim 1, wherein the electric wire guide includes a holding piece configured to hold the electric wire in the electric wire passing portion and a removing hole for forming the holding piece, the removing hole being formed at a position corresponding to the holding piece.

3. The wiring module according to claim 1, wherein the insulating cover and the electric wire guide are respectively connected to the main body on opposite sides of the metal connector.

4. The wiring module according to claim 2, wherein the insulating cover and the electric wire guide are respectively connected to the main body on opposite sides of the metal connector.

5. The wiring module according to claim 1, wherein an electric wire cover configured to cover the electric wire passing portion is supported by the electric wire guide.

6. The wiring module according to claim 2, wherein an electric wire cover configured to cover the electric wire passing portion is supported by the electric wire guide.

7. The wiring module according to claim 3, wherein an electric wire cover configured to cover the electric wire passing portion is supported by the electric wire guide.

8. The wiring module according to claim 4, wherein an electric wire cover configured to cover the electric wire passing portion is supported by the electric wire guide.

9. A wiring module, comprising:
   an insulating protector configured to accommodate a metal connector that is configured to connect neighboring electrode terminals of electrical storage elements that each have a positive electrode terminal and a negative electrode terminal,
   wherein the insulating protector includes:
      a main body configured to hold the metal connector,
      an insulating cover that is supported by the main body so as to be capable of moving to a closed position in which the insulating cover covers at least part of the metal connector when the main body holds the metal connector, and
      an electric wire guide that can be laid over at least a portion of the insulating cover located in the closed position and that has an electric wire passing portion configured to pass an electric wire through the electric wire guide.

10. A wiring module, comprising:
    a metal connector configured to connect neighboring electrode terminals of electrical storage elements that each have a positive electrode terminal and a negative electrode terminal; and
    an insulating protector configured to accommodate the metal connector,
    wherein the insulating protector includes:
       a main body that is configured to hold the metal connector,
       an insulating cover that is supported by the main body so as to be capable of moving to a closed position in which the insulating cover covers at least part of the metal connector when the main body holds the metal connector, and
       an electric wire guide that can be laid over at least a portion of the insulating cover located in the closed position and that has an electric wire passing portion configured to pass an electric wire through the electric wire guide.

11. The wiring module according to claim 1, wherein the metal connector is formed from a metal plate.

12. The wiring module according to claim 9, wherein the metal connector is formed from a metal plate.

13. The wiring module according to claim 10, wherein the metal connector is formed from a metal plate.

* * * * *